United States Patent
Parodi

(10) Patent No.: US 11,521,500 B1
(45) Date of Patent: Dec. 6, 2022

(54) UNMANNED AERIAL SYSTEMS WITH RANGE FINDING

(71) Applicant: Amazon Technologies, Inc., Seattle, WA (US)

(72) Inventor: Carlos Parodi, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1086 days.

(21) Appl. No.: 16/163,390

(22) Filed: Oct. 17, 2018

(51) Int. Cl.
  *G08G 5/00* (2006.01)
  *G01S 15/10* (2006.01)
  *B64C 39/02* (2006.01)

(52) U.S. Cl.
  CPC ............ *G08G 5/0069* (2013.01); *G01S 15/10* (2013.01); *G08G 5/0078* (2013.01); *B64C 39/024* (2013.01); *B64C 2201/027* (2013.01); *B64C 2201/128* (2013.01)

(58) Field of Classification Search
  CPC .... G08G 5/0069; G08G 5/0078; G01S 15/10; B64C 39/024; B64C 2201/027
  USPC .......................................................... 367/99
  See application file for complete search history.

(56) References Cited

U.S. PATENT DOCUMENTS

| | | | | |
|---|---|---|---|---|
| 3,558,822 A | * | 1/1971 | Moshier | B06B 1/0215 367/138 |
| 4,028,648 A | * | 6/1977 | Hartmann | H03H 9/14508 333/195 |
| 4,142,188 A | * | 2/1979 | Zetting | G01V 1/001 340/506 |
| 4,296,349 A | * | 10/1981 | Nakanishi | G10K 11/28 310/326 |
| 5,267,219 A | * | 11/1993 | Woodward | G01S 7/526 367/99 |

(Continued)

OTHER PUBLICATIONS

"Global Positioning System, Standard Positioning Service, Performance Standard," 4th Edition, Sep. 2008, 160 pages.

*Primary Examiner* — Richard A Goldman
(74) *Attorney, Agent, or Firm* — Nicholson De Vos Webster & Elliott LLP

(57) ABSTRACT

Techniques for range finding for an unmanned aerial system are described. As one example, an unmanned aerial system includes at least one motor to provide propulsion, a piezoelectric acoustic actuator having a resonant frequency, a piezoelectric acoustic sensor having the resonant frequency, and a controller to modulate a fixed amplitude and fixed frequency, at the resonant frequency, carrier wave according to a pseudo-random sequence of bits to produce a modulated wave sequence having a respective section of the carrier wave for each bit of the bits of the pseudo-random sequence having a first value, and a respective section of the carrier wave for each bit of the bits of the pseudo-random sequence having a second value, transmit the modulated wave sequence from the piezoelectric acoustic actuator, receive a reflected wave sequence including a reflection of the modulated wave sequence with the piezoelectric acoustic sensor, determine a delay time between the transmit and the receive of the modulated wave sequence based on the reflected wave sequence received by the piezoelectric acoustic sensor and the modulated wave sequence transmitted by the piezoelectric acoustic actuator, and modify power provided to the at least one motor based on the delay time.

20 Claims, 9 Drawing Sheets

(56) References Cited

U.S. PATENT DOCUMENTS

| | | | | |
|---|---|---|---|---|
| 6,261,232 | B1* | 7/2001 | Yokosawa | A61B 8/00 600/443 |
| 6,434,085 | B1* | 8/2002 | Nedwell | G01S 15/104 367/101 |
| 6,466,609 | B2* | 10/2002 | Koslar | H04B 1/69 375/139 |
| 7,532,152 | B1* | 5/2009 | Yonak | G01S 13/93 342/182 |
| 9,823,089 | B1 | 11/2017 | Wilcox et al. | |
| 10,008,085 | B1* | 6/2018 | Gadot | B64C 39/024 |
| 10,101,443 | B1* | 10/2018 | LeGrand, III | B64C 39/024 |
| 10,370,093 | B1* | 8/2019 | Beckman | G01S 1/753 |
| 11,233,544 | B1* | 1/2022 | Pon | H04B 7/0897 |
| 11,319,037 | B2* | 5/2022 | Grail | B63B 3/38 |
| 2003/0112705 | A1* | 6/2003 | Nedwell | G01S 15/104 367/100 |
| 2008/0151692 | A1* | 6/2008 | Dijk | G01S 15/74 367/127 |
| 2008/0153477 | A1* | 6/2008 | Cloutier | H04M 3/42 455/420 |
| 2008/0284540 | A1* | 11/2008 | Nishihara | H03H 9/0576 333/133 |
| 2010/0224441 | A1* | 9/2010 | Fujimori | G10K 11/175 703/3 |
| 2013/0241766 | A1* | 9/2013 | Kishigami | G01S 7/023 342/159 |
| 2014/0169597 | A1* | 6/2014 | Gartner | H04R 25/305 381/314 |
| 2014/0303814 | A1* | 10/2014 | Burema | A01C 21/00 901/1 |
| 2014/0316614 | A1* | 10/2014 | Newman | G06Q 30/0611 705/26.4 |
| 2015/0106316 | A1* | 4/2015 | Birdwell | G06N 3/086 706/33 |
| 2015/0263697 | A1* | 9/2015 | Zhang | H01L 41/18 310/346 |
| 2016/0307448 | A1* | 10/2016 | Salnikov | G05D 1/104 |
| 2016/0380176 | A1* | 12/2016 | Kishino | H03H 9/14517 370/282 |
| 2017/0152059 | A1* | 6/2017 | Peng | B64C 39/024 |
| 2017/0174334 | A1 | 6/2017 | Beckman et al. | |
| 2018/0155056 | A1* | 6/2018 | Balaresque | B64D 47/08 |
| 2018/0273158 | A1* | 9/2018 | Courtin | B64C 39/024 |
| 2018/0295009 | A1* | 10/2018 | Lindoff | H04W 56/001 |
| 2018/0310111 | A1* | 10/2018 | Kappus | G06T 17/00 |
| 2018/0321676 | A1* | 11/2018 | Matuszeski | G05D 1/0055 |
| 2019/0009893 | A1* | 1/2019 | Toyama | B64C 39/024 |
| 2019/0088156 | A1* | 3/2019 | Choi | G05D 1/0038 |
| 2019/0168870 | A1* | 6/2019 | Li | B64C 39/024 |
| 2019/0291856 | A1* | 9/2019 | Kaufman | B64C 27/32 |
| 2019/0321971 | A1* | 10/2019 | Bosworth | B25J 9/1065 |
| 2019/0324456 | A1* | 10/2019 | Ryan | B64C 13/18 |
| 2020/0041998 | A1* | 2/2020 | Kushleyev | G05D 1/0055 |
| 2020/0118451 | A1* | 4/2020 | Dawson-Townsend | G06V 20/10 |
| 2020/0148349 | A1* | 5/2020 | Bosworth | G05D 1/101 |
| 2022/0003863 | A1* | 1/2022 | Habib | B64C 29/0025 |
| 2022/0066456 | A1* | 3/2022 | Ebrahimi Afrouzi | A47L 9/30 |
| 2022/0108262 | A1* | 4/2022 | Cella | G05B 19/41885 |

* cited by examiner

700

```
┌─────────────────────────────────────────────────────────────┐
│ PROVIDING POWER TO AT LEAST ONE MOTOR OF AN UNMANNED        │
│ AERIAL SYSTEM TO PROVIDE PROPULSION, WHEREIN THE            │
│ UNMANNED AERIAL SYSTEM INCLUDES AN ACOUSTIC ACTUATOR        │
│ HAVING A RESONANT FREQUENCY AND AN ACOUSTIC SENSOR          │
│ HAVING THE RESONANT FREQUENCY 702                           │
└─────────────────────────────────────────────────────────────┘
                              │
                              ▼
┌─────────────────────────────────────────────────────────────┐
│ MODULATING A FIXED FREQUENCY, AT THE RESONANT               │
│ FREQUENCY, CARRIER WAVE ACCORDING TO A PSEUDO-RANDOM        │
│ SEQUENCE OF BITS TO PRODUCE A MODULATED WAVE                │
│ SEQUENCE HAVING A RESPECTIVE SECTION OF THE CARRIER         │
│ WAVE FOR EACH BIT OF THE BITS OF THE PSEUDO-RANDOM          │
│ SEQUENCE HAVING A FIRST VALUE, AND A RESPECTIVE SECTION     │
│ WITHOUT THE CARRIER WAVE FOR EACH BIT OF THE BITS OF THE    │
│ PSEUDO-RANDOM SEQUENCE HAVING A SECOND VALUE 704            │
└─────────────────────────────────────────────────────────────┘
                              │
                              ▼
┌─────────────────────────────────────────────────────────────┐
│ TRANSMITTING THE MODULATED WAVE SEQUENCE FROM THE           │
│ ACOUSTIC ACTUATOR 706                                       │
└─────────────────────────────────────────────────────────────┘
                              │
                              ▼
┌─────────────────────────────────────────────────────────────┐
│ RECEIVING A REFLECTED WAVE SEQUENCE INCLUDING A             │
│ REFLECTION OF THE MODULATED WAVE SEQUENCE WITH THE          │
│ ACOUSTIC SENSOR 708                                         │
└─────────────────────────────────────────────────────────────┘
                              │
                              ▼
┌─────────────────────────────────────────────────────────────┐
│ DETERMINING A DELAY TIME BETWEEN THE TRANSMITTING AND       │
│ THE RECEIVING OF THE MODULATED WAVE SEQUENCE BASED ON       │
│ THE REFLECTED WAVE SEQUENCE RECEIVED BY THE ACOUSTIC        │
│ SENSOR AND THE MODULATED WAVE SEQUENCE TRANSMITTED          │
│ BY THE ACOUSTIC ACTUATOR 710                                │
└─────────────────────────────────────────────────────────────┘
                              │
                              ▼
┌─────────────────────────────────────────────────────────────┐
│ MODIFYING THE POWER PROVIDED TO THE AT LEAST ONE MOTOR      │
│ BASED ON THE DELAY TIME 712                                 │
└─────────────────────────────────────────────────────────────┘
```

*FIG. 7*

UNMANNED AERIAL SYSTEMS WITH RANGE FINDING

BACKGROUND

Historically, vehicle traffic around homes and neighborhoods was primarily limited to automobile traffic. However, the recent development of aerial vehicles, such as unmanned aerial vehicles, has resulted in a rise of other forms of vehicle traffic. For example, hobbyists may fly unmanned aerial vehicles in and around neighborhoods, often within a few feet of a home. Likewise, there is discussion of electronic-commerce retailers, and other entities, delivering items directly to a user's home using unmanned aerial vehicles. As a result, such vehicles may be invited to navigate into a backyard, near a front porch, balcony, patio, and/or other locations around the residence to complete delivery of packages.

BRIEF DESCRIPTION OF DRAWINGS

Various embodiments in accordance with the present disclosure will be described with reference to the drawings, in which:

FIG. 7 is a flow diagram illustrating the range finding control of an unmanned aerial system according to some embodiments.

DETAILED DESCRIPTION

Figure 1:
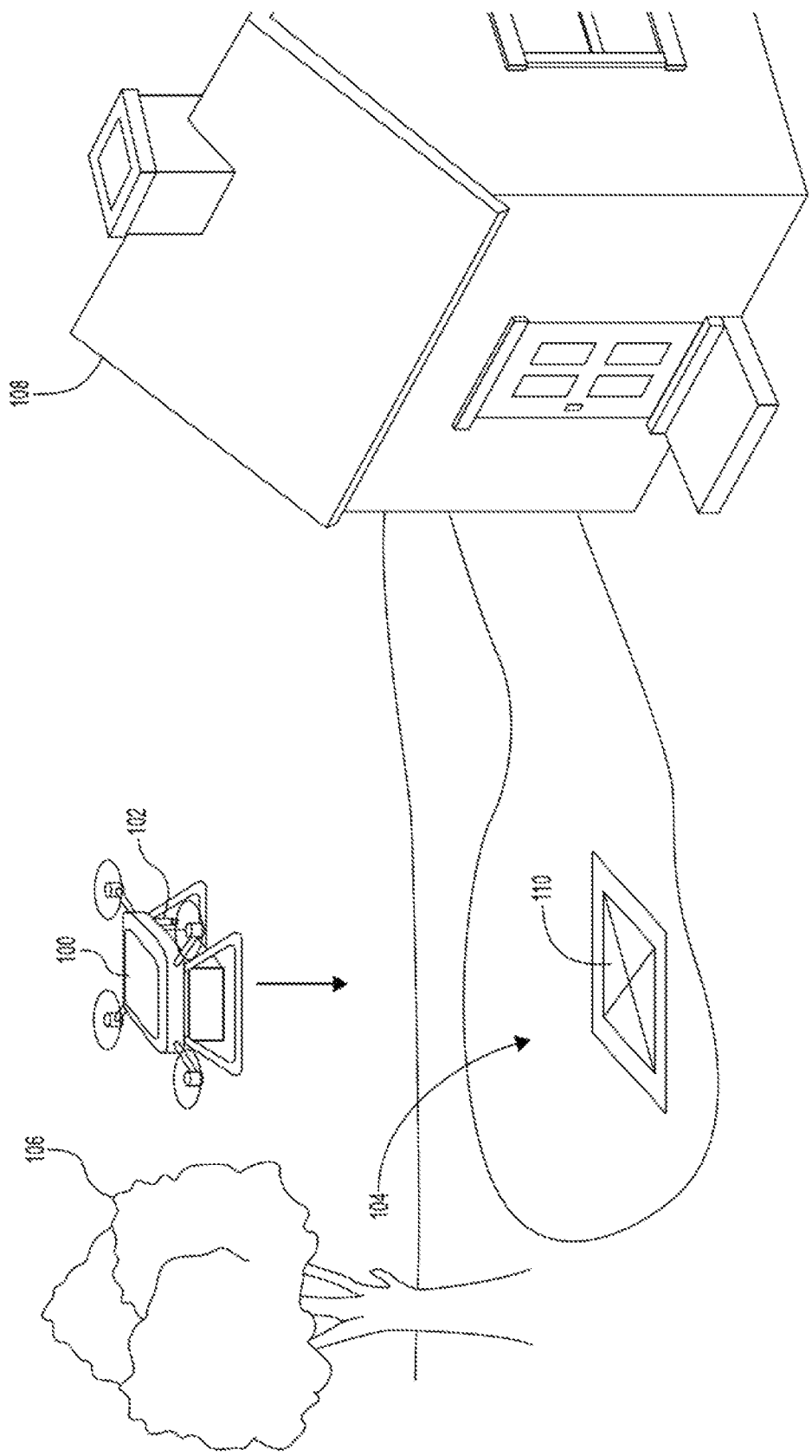
FIG. 1 depicts a residential landing target for an unmanned aerial system according to some embodiments.

Various embodiments of methods, apparatuses, systems, and non-transitory computer-readable storage media for range finding are described. According to some embodiments, an unmanned aerial system (UAS) includes an (e.g., piezoelectric) acoustic actuator to transmit acoustic data at a resonant frequency and a (e.g., piezoelectric) acoustic sensor to receive acoustic data at a (e.g., same) resonant frequency. Certain range (e.g., distance) finding may include frequency modulation of the transmitted data to allow identification of that transmitted data on receipt of the reflection (e.g., echo) of that transmitted data off a surface. However, certain acoustic transducers (e.g., actuators and/or sensors) are only resonant at (e.g., operable at) a single frequency or at a narrow range of frequencies that does not allow for frequency modulation.

Certain embodiments herein utilize acoustic transducers (e.g., actuators and/or sensors) that are only resonant at (e.g., operable at) a single frequency or at a narrow range of frequencies that does not allow for frequency modulation in range finding. Certain embodiments herein allow for such (e.g., piezoelectric) transducers to modulate the transmitted data to allow identification of that transmitted data on receipt of the reflection (e.g., echo) of that transmitted data off a surface, for example, in contrast to transmitting a single frequency (e.g., and single amplitude) of data without any identification of the true echo apart from any similar data of equivalent frequency because the transmitted data was not modulated with any information.

Certain embodiments herein allow for the determination of a delay time between transmitting data and receiving a reflection of that data off an object (e.g., corresponding to the time-of-flight and/or distance to the object from an unmanned aerial system) with an acoustic transducer (e.g., actuator and/or sensor) without using frequency modulation. Certain embodiments herein allow for the determination of a delay time between transmitting data and receiving a reflection of that data off an object (e.g., corresponding to the time-of-flight and/or distance to the object from an unmanned aerial system) with an acoustic transducer (e.g., actuator and/or sensor) that is only resonant at (e.g., operable at) a single frequency or at a narrow range of frequencies that does not allow for frequency modulation. Certain embodiments herein utilize a pseudo-random sequence of bits (e.g., a sequence of bits whose properties approximate the properties of sequences of random numbers) to modulate carrier data to produce a modulated data sequence that allows identification of that transmitted data, e.g., in contrast to unmodulated data. Certain embodiments herein only perform an on-off modulation of carrier data based on an input value (e.g., the pseudo-random sequence of bits), and do not change the frequency of the carrier data and do not change the amplitude of an on portion of the carrier data. Certain embodiments herein further perform two-dimensional receiver beam forming to allow three-dimensional SOund Navigation And Ranging (SONAR) ranging.

The following describes the use of the range finding disclosed herein for an unmanned aerial system, but it should be understood that other usages are possible, for example, manned aerial systems, automobiles (e.g., cars and trucks), etc.

FIG. 1 depicts a residential landing target 104 for an unmanned aerial system 100 according to some embodiments. As the unmanned aerial system 100 (e.g. vehicle) descends toward the residential landing target 104 (e.g., delivery destination), one or more cameras, acoustic transducer(s) 102 (e.g., actuators and/or sensors), or other environmental/operational transducers may be used. For example, a camera(s) may obtain an image of a marker 110 positioned at the residential landing target 104. The marker may be of a known size, shape, color, and/or include a known pattern. For example, the marker may be provided to a customer by an electronic commerce retailer for placement at the residential landing target 104 to aid in identification of the delivery destination and delivery of a payload. The images of the marker 110 obtained by camera(s) of the unmanned aerial system 100 may be processed to determine a size, shape, color, position, orientation, pattern, etc., of the marker as represented in the image and that processed information may be compared with actual information about the marker to verify that the unmanned aerial system 100 may continue to land and the payload delivered to the delivery destination.

Figure 2:
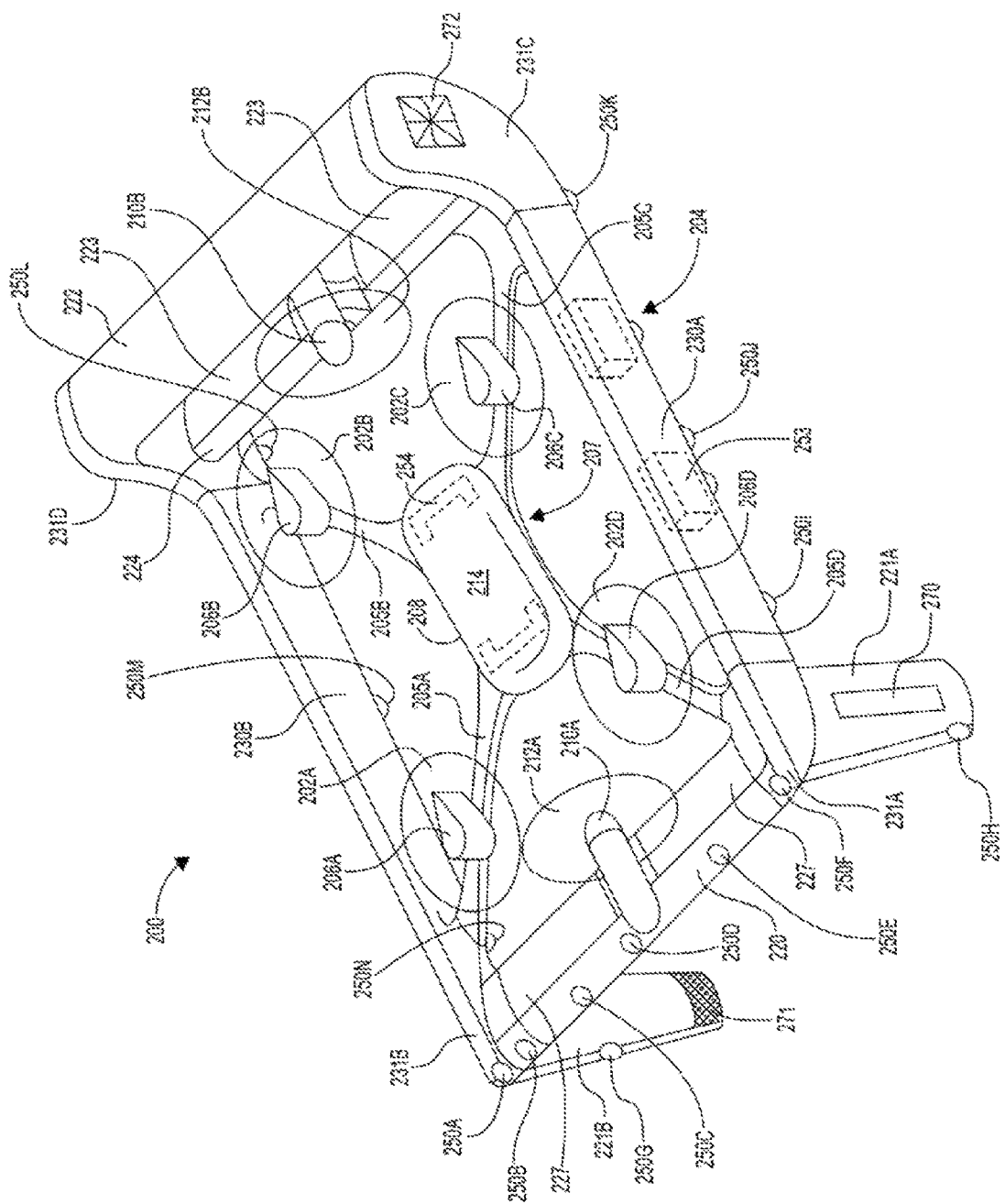
FIG. 2 depicts an unmanned aerial system according to some embodiments.

As the unmanned aerial system 100 begins its decent toward residential landing target 104 (e.g., to land), range finding may be utilized to determine a distance (e.g., delay time from transmittal of a modulated wave sequence to receipt of a reflection (e.g., echo) of the modulated wave sequence) to an object, for example, and that distance used to avoid any undesired contact with tree 106, house 108, etc. In certain embodiment, range finding of unmanned aerial system 100 utilizes at least one acoustic transducer (e.g., actuator and/or sensor) without using frequency modulation. In one embodiment, an acoustic transducer (e.g., actuator) is only resonant at (e.g., operable at) a single frequency or at a narrow range of frequencies that does not allow for frequency modulation. FIG. 2 provides further details of an embodiment of an unmanned aerial system.

FIG. 2 depicts an unmanned aerial system 200 according to some embodiments. As illustrated, unmanned aerial system 200 includes one or more environmental/operational transducers 250A-250N (e.g., sensors and/or actuators). Although transducers A through N are depicted, any single or plurality of numbers of transducers (e.g., pair of transmitting actuators and receiving sensors) may be utilized. In certain embodiment, range finding of unmanned aerial system 200 utilizes at least one acoustic transducer 250A-250N (e.g., actuator and/or sensor) without using frequency modulation. In one embodiment, an acoustic transducer 250A-250N (e.g., actuator) is only resonant at (e.g., operable at) a single frequency or at a narrow range of frequencies that does not allow for frequency modulation. In certain embodiments, control system 214 of an unmanned aerial system 200 operates according to the disclosure herein, e.g., to perform range finding.

Unmanned aerial system 200 includes a perimeter frame 204 that includes a front wing 220, a lower rear wing 224, an upper rear wing 222, and two horizontal side rails 230A, 230B. The horizontal side rails 230A-230B are coupled to opposing ends of the front wing 220 and opposing ends of the upper rear wing 222 and lower rear wing 224. In some implementations, the coupling may be with a corner junction, such as the front left corner junction 231A, the front right corner junction 231B, the rear left corner junction 231C, and the rear right corner junction 231D. In such an example, the corner junctions are also part of the perimeter frame 204.

The components of the perimeter frame 204, such as the front wing 220, lower rear wing 224, upper rear wing 222, side rails 230A, 230B, and corner junctions 231A-231D may be formed of any one or more suitable materials, such as graphite, carbon fiber, aluminum, titanium, etc., or any combination thereof. In one embodiment, the components of the perimeter frame 204 of the unmanned aerial system 200 are each formed of carbon fiber and joined at the corners using corner junctions 231A-231D. The components of the perimeter frame 204 may be coupled using a variety of techniques. For example, if the components of the perimeter frame 204 are carbon fiber, they may be fitted together and joined using secondary bonding. In other implementations, the components of the perimeter frame 204 may be affixed with one or more attachment mechanisms, such as screws, rivets, latches, quarter-turn fasteners, etc., or otherwise secured together in a permanent or removable manner.

The front wing 220, lower rear wing 224, and upper rear wing 222 are positioned in a tri-wing configuration and each wing provides lift to the unmanned aerial system 200 when the unmanned aerial system is moving in a direction that includes a horizontal component. For example, the wings may each have an airfoil shape that causes lift due to the airflow passing over the wings during horizontal flight.

Opposing ends of the front wing 220 may be coupled to a corner junction, such as the front left corner junction 231A and front right corner junction 231B. In some implementations, the front wing may include one or more control surfaces, such as flaps 227 or ailerons, that are used to adjust the pitch, yaw, and/or roll of the unmanned aerial system 200 alone or in combination with the lifting motors 206A-206D, lifting propellers 202A-202D, thrusting motors 210A-210D, thrusting propellers 212A-212B, and/or other control surfaces (e.g., flaps on the rear wings) discussed below. In some implementations, the flaps 227 may also be used as a protective shroud to further hinder access to the lifting propellers 202A-202D by objects external to the unmanned aerial system 200. For example, when the unmanned aerial system 200 is moving in a vertical direction or hovering, the flaps 227 may be extended to increase the height of the protective barrier around a portion of the lifting propellers 202A-202D.

In certain embodiments, the motor(s) (e.g., power to the motor(s)) and/or control surfaces are controlled by the control system 214 of an unmanned aerial system 200 based on the range finding (e.g., based on the determined time delay discussed herein).

In some implementations, the front wing 220 may include two or more pairs of flaps 227, as illustrated in FIG. 2. In other implementations, for example, if there is no front thrusting motor 210A, the front wing 220 may only include a single flap 227 that extends substantially the length of the front wing 220. If the front wing 220 does not include flaps 227, the lifting motors 206A-206D and lifting propellers 202A-202D, thrusting motors 210A-210B, thrusting propellers 212A-212B, and/or flaps of the rear wings may be utilized to control the pitch, yaw, and/or roll of the unmanned aerial system 200 during flight.

Opposing ends of the lower rear wing 224 may be coupled to a corner junction, such as the rear left corner junction 231C and rear right corner junction 231D. In some implementations, the lower rear wing may include one or more flaps 223 or ailerons that may be used to adjust the pitch, yaw and/or roll of the unmanned aerial system 200 alone or in combination with the lifting motors 206A-206D, lifting propellers 202A-202D, thrusting motors 210A-210B, thrusting propellers 212A-212B, and/or the flaps 227 of the front wing. In some implementations, the flaps 223 may also be used as a protective shroud to further hinder access to the lifting propellers 202A-202D by objects external to the unmanned aerial system 200. For example, when the unmanned aerial system 200 is moving in a vertical direction or hovering, the flaps 223 may be extended, similar to the extending of the front flaps 227 of the front wing 220.

In some implementations, the rear wing 224 may include two or more flaps 223, as illustrated in FIG. 2, or two or more pairs of flaps, respectively. In other implementations, for example, if there is no rear thrusting motor 210B mounted to the lower rear wing, the rear wing 224 may only include a single flap 223 that extends substantially the length of the lower rear wing 224. In other implementations, if the lower rear wing includes two thrusting motors, the lower rear wing includes three flaps 223, one on either end of the lower rear wing 224, and one between the two thrusting motors mounted to the lower rear wing 224.

Opposing ends of the upper rear wing 222 may be coupled to a corner junction, such as the rear left corner junction 231C and rear right corner junction 231D. In some implementations, like the lower rear wing, the upper rear wing 222 may include one or more flaps (not shown) or ailerons that may be used to adjust the pitch, yaw and/or roll of the unmanned aerial system 200 alone or in combination with the lifting motors 206A-206D, lifting propellers 202A-

202D, thrusting motors 210A-210B, thrusting propellers 212A-212B, and/or other flaps of other wings. In some implementations, the flaps may also be used as a protective shroud to further hinder access to the lifting propellers 202A-202D by objects external to the unmanned aerial system 200. For example, when the unmanned aerial system 200 is moving in a vertical direction or hovering, the flaps may be extended, similar to the extending of the front flaps 227 of the front wing 220 or the flaps 223 of the lower rear wing 224.

The front wing 220, lower rear wing 224, and upper rear wing 222 may be positioned and sized proportionally to provide stability to the unmanned aerial system while the unmanned aerial system 200 is moving in a direction that includes a horizontal component. For example, the lower rear wing 224 and the upper rear wing 222 are stacked vertically such that the vertical lift vectors generated by each of the lower rear wing 224 and upper rear wing 222 are close together, which may be destabilizing during horizontal flight. In comparison, the front wing 220 is separated from the rear wings longitudinally such that the vertical lift vector generated by the front wing 220 acts together with the vertical lift vectors of the lower rear wing 224 and the upper rear wing 222, providing efficiency, stabilization and control.

In some implementations, to further increase the stability and control of the unmanned aerial system 200, one or more winglets 221A-221B, or stabilizer arms, may also be coupled to and included as part of the perimeter frame 204. In the example illustrated with respect to FIG. 2, there are two front winglets 221A and 221B mounted to the underneath side of the front left corner junction 231A and the front right corner junction 231B, respectively. The winglets 221A-221B extend in a downward direction approximately perpendicular to the front wing 220 and side rails 230A-230B. Likewise, the two rear corner junctions 231C, 231D are also formed and operate as winglets providing additional stability and control to the unmanned aerial system 200 when the unmanned aerial system 200 is moving in a direction that includes a horizontal component.

The winglets 221A-221B and the rear corner junctions 231C-231D may have dimensions that are proportional to the length, width, and height of the unmanned aerial system 200 and may be positioned based on the approximate center of gravity of the unmanned aerial system 200 to provide stability and control to the unmanned aerial system 200 during horizontal flight.

Coupled to the interior of the perimeter frame 204 is a central frame 207. The central frame 207 includes a hub 208 and motor arms 205A-205D that extend from the hub 208 and couple to the interior of the perimeter frame 204. In this example, there is a single hub 208 and four motor arms 205A, 205B, 205C, and 205D. Each of the motor arms 205A-205D extend from approximately a corner of the hub 208 and couple or terminate into a respective interior corner of the perimeter frame. In some implementations, each motor arm 205A-205D may couple into a corner junction 231A-231D of the perimeter frame 204. Like the perimeter frame 204, the central frame 207 may be formed of any suitable material, such as graphite, carbon fiber, aluminum, titanium, etc., or any combination thereof. In one embodiment, the central frame 207 is formed of carbon fiber and joined at the corners of the perimeter frame 204 at the corner junctions 231A-231D. Joining of the central frame 207 to the perimeter frame 204 may be done using any one or more of the techniques discussed above for joining the components of the perimeter frame 204.

Lifting motors 206A-206D are coupled at approximately a center of each motor arm 205A-205D so that the lifting motor 206A-206D and corresponding lifting propeller 202A-202D are within the substantially rectangular shape of the perimeter frame 204. In one implementation, the lifting motors 206A-206D are mounted to an underneath or bottom side of each motor arm 205A-205D in a downward direction so that the propeller shaft of the lifting motor that mounts to the lifting propeller 202A-202D is facing downward. In other implementations, as illustrated in FIG. 2, the lifting motors 206A-206D may be mounted to a top of the motor arms 205A-205D in an upward direction so that the propeller shaft of the lifting motor that mounts to the lifting propeller 202A-202D is facing upward. In this example, there are four lifting motors 206A, 206B, 206C, 206D, each mounted to an upper side of a respective motor arm 205A, 205B, 205C, and 205D.

In some implementations, multiple lifting motors may be coupled to each motor arm 205A-205D. For example, while FIG. 2 illustrates a quad-copter configuration with each lifting motor mounted to a top of each motor arm, a similar configuration may be utilized for an octo-copter. For example, in addition to mounting a motor 206A-206D to an upper side of each motor arm 205A-205D, another lifting motor may also be mounted to an underneath side of each motor arm 205A-205D and oriented in a downward direction. In another implementation, the central frame may have a different configuration, such as additional motor arms. For example, eight motor arms may extend in different directions and a lifting motor may be mounted to each motor arm.

The lifting motors may be any form of motor capable of generating enough rotational speed with the lifting propellers 202A-202D to lift the unmanned aerial system 200 and any engaged payload, thereby enabling aerial transport of the payload.

Mounted to each lifting motor 206A-206D is a lifting propeller 202A-202D. The lifting propellers 202A-202D may be any form of propeller (e.g., graphite, carbon fiber) and of a size sufficient to lift the unmanned aerial system 200 and any payload engaged by the unmanned aerial system 200 so that the unmanned aerial system 200 can navigate through the air, for example, to deliver a payload to a delivery location. For example, the lifting propellers 202A-202D may each be carbon fiber propellers having a dimension or diameter of twenty-four inches. While the illustration of FIG. 2 shows the lifting propellers 202A-202D all of a same size, in some implementations, one or more of the lifting propellers 202A-202D may be different sizes and/or dimensions. Likewise, while this example includes four lifting propellers 202A, 202B, 202C, 202D, in other implementations, more or fewer propellers may be utilized as lifting propellers. Likewise, in some implementations, the lifting propellers may be positioned at different locations on the unmanned aerial system 200. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the unmanned aerial system.

In addition to the lifting motors 206A-206D and lifting propellers 202A-202D, the unmanned aerial system 200 may also include one or more thrusting motors 210A-210B and corresponding thrusting propellers 212A-212B. The thrusting motors and thrusting propellers may be the same or different than the lifting motors 206A-206D and lifting propellers 202A-202D. For example, in some implementations, the thrusting propellers may be formed of carbon fiber and be approximately eighteen inches long. In other implementations, the thrusting motors may utilize other forms of propulsion to propel the unmanned aerial system. For example, fans, jets, turbojets, turbo fans, jet engines, internal combustion engines, and the like may be used (either with propellers or with other devices) as the thrusting motors.

The thrusting motors and thrusting propellers may be oriented at approximately ninety degrees with respect to the perimeter frame 204 and central frame 207 of the unmanned aerial system 200 and utilized to increase the efficiency of flight that includes a horizontal component. For example, when the unmanned aerial system 200 is traveling in a direction that includes a horizontal component, the thrusting motors may be engaged to provide a horizontal thrust force via the thrusting propellers to propel the unmanned aerial system 200 horizontally. As a result, the speed and power utilized by the lifting motors 206A-206D may be reduced. Alternatively, in selected implementations, the thrusting motors may be oriented at an angle greater or less than ninety degrees with respect to the perimeter frame 204 and the central frame 207 to provide a combination of thrust and lift.

In the example illustrated in FIG. 2, the unmanned aerial system 200 includes two thrusting motors 210A, 210B and corresponding thrusting propellers 212A, 212B. Specifically, in the illustrated example, there is a front thrusting motor 210A coupled to and positioned near an approximate mid-point of the front wing 220. The front thrusting motor 210A is oriented such that the corresponding thrusting propeller 212A is positioned inside the perimeter frame 204. The second thrusting motor is coupled to and positioned near an approximate mid-point of the lower rear wing 224. The rear thrusting motor 210B is oriented such that the corresponding thrusting propeller 212B is positioned inside the perimeter frame 204.

While the example illustrated in FIG. 2 illustrates the unmanned aerial system with two thrusting motors 210A-210B and corresponding thrusting propellers 212A-212B, in other implementations, there may be fewer or additional thrusting motors and corresponding thrusting propellers. For example, in some implementations, the unmanned aerial system 200 may only include a single rear thrusting motor 210A or 210B and corresponding thrusting propeller 212A or 212B. In another implementation, there may be two thrusting motors and corresponding thrusting propellers mounted to the lower rear wing 224. In such a configuration, the front thrusting motor 210A may be included or omitted from the unmanned aerial system 200. Likewise, while the example illustrated in FIG. 2 shows the thrusting motors oriented to position the thrusting propellers inside the perimeter frame 204, in other implementations, one or more of the thrusting motors 210A-210B may be oriented such that the corresponding thrusting propeller 212A-212B is oriented outside of the protective frame 204.

The perimeter frame 204 provides safety for objects foreign to the unmanned aerial system 200 by inhibiting access to the lifting propellers 202A-202D from the side of the unmanned aerial system 200, provides protection to the unmanned aerial system 200, and increases the structural integrity of the unmanned aerial system 200. For example, if the unmanned aerial system 200 is traveling horizontally and collides with a foreign object (e.g., wall, building), the impact between the unmanned aerial system 200 and the foreign object will be with the perimeter frame 204, rather than a propeller. Likewise, because the frame is interconnected with the central frame 207, the forces from the impact are dissipated across both the perimeter frame 204 and the central frame 207.

The perimeter frame 204 also provides a surface upon which one or more components of the unmanned aerial system 200 may be mounted. Alternatively, or in addition thereto, one or more components of the unmanned aerial system may be mounted or positioned within the cavity of the portions of the perimeter frame 204. For example, one or more antennas may be mounted on or in the front wing 220. The antennas may be used to transmit and/or receive wireless communications. For example, the antennas may be utilized for Wi-Fi, satellite, near field communication ("NFC"), cellular communication, or any other form of wireless communication. Other components (e.g., actuators or sensors), such as imaging elements (e.g., cameras), time of flight sensors, accelerometers, inclinometers, distance-determining elements, barometers, magnetic sensors, gimbals, Global Positioning System (GPS) receiver/transmitter, radars, illumination elements, speakers, and/or any other component of the unmanned aerial system 200 or the control system of an unmanned aerial system (discussed below), etc., may likewise be mounted to or in the perimeter frame 204. Likewise, identification or reflective identifiers, such as identifiers 270, 271, 272 may be mounted to the perimeter frame 204 to aid in the identification of the unmanned aerial system 200.

In some implementations, as discussed below, one or more environmental/operational transducers 250A-250N (e.g., sensors and/or actuators) are included on the unmanned aerial system 200. The environmental/operational transducers 250A-250N may include imaging elements, such as digital still cameras, red, green, blue (RGB) cameras, video cameras, thermographic cameras, etc., mounted to (e.g., and spaced about) the frame of the unmanned aerial system 200. The environmental/operational transducers 250A-250N may include one or more distance determining elements coupled to the frame of the aerial system (e.g., vehicle). Any type of distance determining element may be utilized, including, but not limited to, a time-of-flight sensor, range finder, Sound Navigation and Ranging ("SONAR"), Light Detection and Ranging ("LIDAR"), etc.

In one embodiment, one or more of environmental/operational transducers 250A-250N includes at least one acoustic transducer (e.g., actuator and/or sensor). In one embodiment, an acoustic transducer (e.g., actuator) is only resonant at (e.g., operable at) a single frequency or at a narrow range of frequencies that does not allow for frequency modulation. In one embodiment, an acoustic transducer is a piezoelectric acoustic transducer. In one embodiment, a piezoelectric acoustic (e.g., sound) transducer includes a crystal material therein that generates an electric charge under mechanical (e.g., acoustic) stress and generates a mechanical (e.g., acoustic) strain on the application of an electric field. In one embodiment, a piezoelectric acoustic transducer (e.g., sensor or actuator) has an (e.g., ultrasonic) resonant frequency of about 40,000 Hertz (40 kHz) or about 50,000 Hertz (50 kHz).

In one embodiment, a single (e.g., same) acoustic transducer is used as both the acoustic actuator and the acoustic sensor in a range finding operation, for example, where the control system 214 switches the single (e.g., same) acoustic transducer from an actuator mode to transmit modulated data (e.g., a modulated wave sequence) and a sensor mode to receive the reflected data (e.g., reflected wave sequence).

As illustrated, the environmental/operational transducers 250A-250N may be affixed to any portion of the frame of the unmanned aerial system 200. For example, environmental/operational transducers 250A-250N may be arranged along the front of the front wing 220, e.g., facing forward. As another example, environmental/operational transducers 250A-250N may be arranged along the underneath or lower side of the side rail 230A, e.g., facing downward. As will be appreciated, any number of environmental/operational transducers 250A-250N may be included on any portion of the frame 204 and oriented in (e.g., facing) any position. In some implementations, environmental/operational transducers 250A-250N may be positioned such that approximately all areas around the aerial system are within a field of view of at least one of the environmental/operational transducers 250A-250N.

In some implementations, the perimeter frame 204 may also include a permeable material (e.g., mesh, screen) that extends over the top and/or lower surface of the perimeter frame 204 enclosing the central frame, lifting motors, and/or lifting propellers.

A control system 214 of unmanned aerial system 200 (e.g., control system 800 in FIG. 8) is also mounted to the central frame 207. In this example, the control system 214 of unmanned aerial system 200 is mounted to the hub 208 and is enclosed in a protective barrier. The protective barrier may provide the control system 214 weather protection so that the unmanned aerial system 200 may operate in rain and/or snow without disrupting the control system 214. In some implementations, the protective barrier may have an aerodynamic shape to reduce drag when the unmanned aerial system is moving in a direction that includes a horizontal component. The protective barrier may be formed of any materials including, but not limited to, graphite-epoxy, Kevlar® brand, and/or fiberglass. In some implementations, multiple materials may be utilized. For example, Kevlar® brand materials may be utilized in areas where signals need to be transmitted and/or received.

The unmanned aerial system 200 includes one or more power modules 253. In some implementations, the power modules 253 may be positioned inside a cavity of the side rails 230A, 230B. In other implementations, the power modules 253 may be mounted or positioned at other locations of the unmanned aerial system. The power modules 253 for the unmanned aerial system may be in the form of battery power, solar power, gas power, super capacitor, fuel cell, alternative power generation source, or a combination thereof. The power module(s) are coupled to and provide power for the control system 214 of unmanned aerial system 200, the lifting motors 206A-206D, the thrusting motors 210A-210B, the environmental/operational transducers 250A-250N, the payload engagement mechanism 254, and/or other components and/or sensors of the aerial system.

In some implementations, one or more of the power modules 253 is autonomously removed and/or replaced with another power module while the unmanned aerial system is landed or in flight. For example, when the unmanned aerial system lands at a location, the unmanned aerial system may engage with a charging member at the location that will recharge the power module.

The unmanned aerial system 200 may also include a payload engagement mechanism 254 to engage and disengage items and/or containers that hold items (payload). In this example, the payload engagement mechanism 254 is positioned beneath and coupled to the hub 208 of the frame 204 of the unmanned aerial system 200. The payload engagement mechanism 254 may be of any size sufficient to securely engage and disengage a payload. In other implementations, the payload engagement mechanism 254 may operate as the container in which it contains item(s). The payload engagement mechanism 254 communicates with (e.g., via wired or wireless communication) and is controlled by the control system 214 of unmanned aerial system 200.

As noted above, certain embodiments of (e.g., piezoelectric) transducers are resonant at a single frequency or at a narrow range of frequencies that does not allow for frequency modulation. As such, embodiments herein utilize on-off modulation of carrier data (e.g., a carrier wave) based on a digital input value of a pseudo-random sequence of bits to produce modulated data (e.g., a modulated wave sequence).

Figure 3:
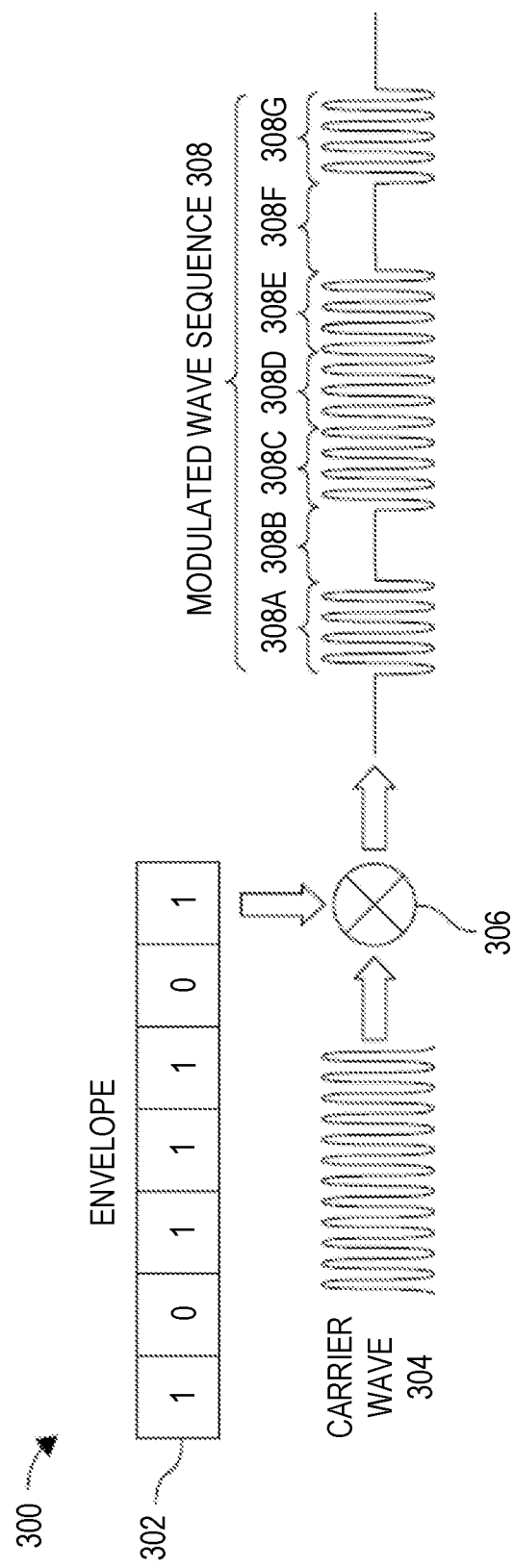
FIG. 3 is a flow diagram illustrating the production of a modulated wave sequence according to some embodiments.

FIG. 3 is a flow diagram 300 illustrating the production of a modulated wave sequence 308 according to some embodiments. Flow diagram 300 depicts on-off modulation of carrier data (e.g., a carrier wave 304) based on a digital input value of a (e.g., pseudo-random) sequence of bits 302 to produce modulated data (e.g., a modulated wave sequence 308). In one embodiment, a control system (e.g., control system 214 of unmanned aerial system 200) includes circuitry according to flow diagram 300. Carrier data (e.g., carrier wave 304) may be a single (non-zero) frequency and/or single (non-zero) amplitude. In certain embodiments, the single frequency of the carrier wave is the resonant frequency (or in the narrow range of resonant frequencies) of a (e.g., piezoelectric) transducer utilized (e.g., actuator and/or sensor having the same resonant frequency as the carrier wave frequency). In the illustrated embodiment, the (e.g., pseudo-random) sequence of bits 302 includes seven bits (e.g., with 1 as binary high and 0 as binary low), although any plurality of bits may be utilized. As such, the circuit 306 (e.g., implementing a multiplier or modulator) is to output the carrier wave (e.g., for a set length of time) for a first value (e.g., binary 1) of a corresponding bit position of the sequence of bits 302, and to not output anything (e.g., not output the carrier wave for the same, set length of time) for a second, different first value (e.g., binary 0) of a corresponding bit position of the sequence of bits 302. In the depicted embodiment, the first element (e.g., from an end of the sequence of bits 302) is a 1, and thus the modulated wave sequence 308 includes a carrier wave section 308G for the first element. In the depicted embodiment, the second element (e.g., from an end of the sequence of bits 302) is a 0, and thus the modulated wave sequence 308 includes a section 308F without a carrier wave section (e.g., with no output) for the second element. This is repeated for each of the five remaining bits of the sequence of bits 302 for elements 3-7 to produce the sections (308E-308A, respectively) for the modulated wave sequence 308. In one embodiment, a control system (e.g., control system 214 of unmanned aerial system 200) includes a linear-feedback shift register to generate a pseudo-random sequence of bits 302 (e.g., the envelope). In one embodiment, each next modulated wave sequence 308 utilizes a different (e.g., pseudo-random) sequence of bits 302 (e.g. of the same length or differing lengths of bits), and thus a different (e.g., pseudo-random) modulated wave sequence 308. In certain embodiment, using a pseudo-random sequence of bits (e.g., one with good self-correlation) for on/off modulation, allows the time delay (e.g., including the time of flight of the echo of transmitted data) to be determined using (e.g., digital) correlation. In certain embodiments, the (e.g., pseudo-random) sequence of (e.g., binary) bits 302 is a sequence with good (e.g., high) autocorrelation (e.g., only matches itself). In one embodiment, a sequence with good (e.g., high) autocorrelation is generated by a prime polynomial, linear-feedback shift register.

In one embodiment, a controller is to use a shorter length of the pseudo-random sequence of bits 302 (and thus create a shorter transmittal time for a shorter modulated wave sequence 308) as the delay time between the transmittal and the receipt of the modulated wave sequence decreases (e.g., as the unmanned aerial system approaches an object), for example, to shorten the overall processing time to determine the delay time.

Figure 4:
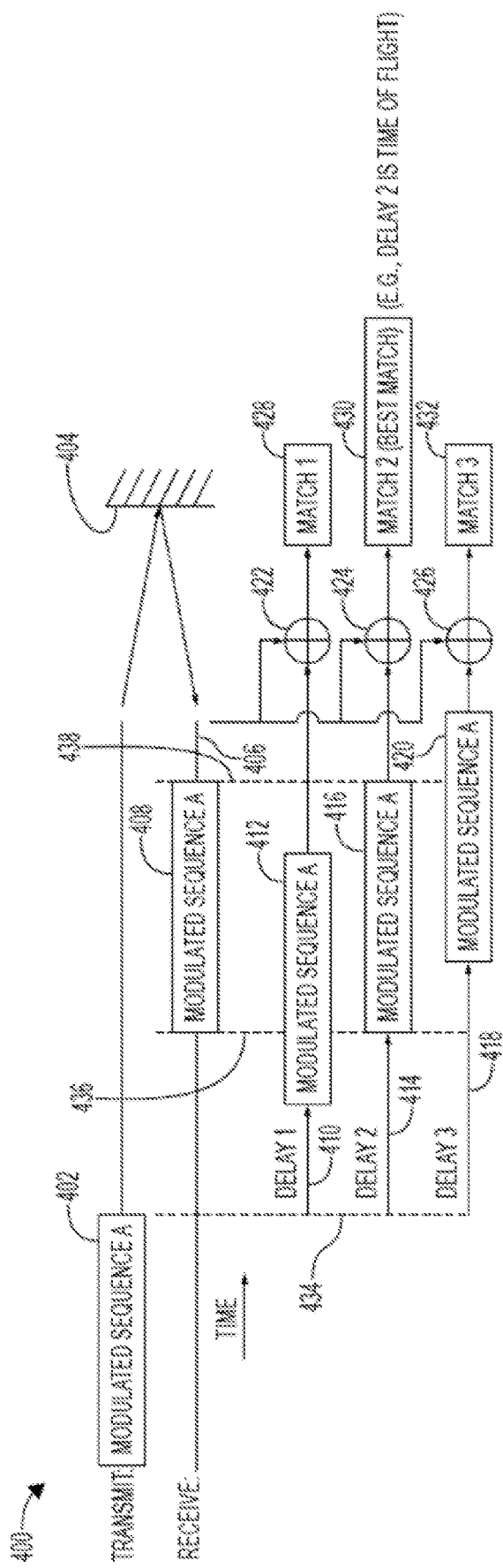
FIG. 4 is a flow diagram illustrating the determination of a delay time from a transmitted, modulated wave sequence and a received, reflected wave sequence according to some embodiments.

FIG. 4 is a flow diagram 400 illustrating the determination of a delay time from a transmitted, modulated wave sequence 402 and a received, reflected wave sequence 408 according to some embodiments. In one embodiment, a control system (e.g., control system 214 of unmanned aerial system 200) includes circuitry according to flow diagram 400. Depicted flow 400 includes transmittal of modulated data 402 (e.g., a modulated wave sequence 308 from FIG. 3) from a (e.g., piezoelectric) transducer, and receipt of reflected data 406 that includes the reflection 408 of the modulated data 402 off surface 404.

In certain embodiments, the flow 400 includes time-shifting the transmitted modulated data 402 a plurality of offset time intervals (e.g., first delay 410, second delay 414, and third delay 418) until a maximum number of matching values between the time-shifted data (412, 416, 420) and the received modulated data 406 (e.g., the received, reflected wave sequence 408). Although three different time delays (e.g., offsets) are shown, any plurality of delays may be utilized. In one embodiment, the transmitted modulated data 402 is modified (e.g., reversed) from its transmitted form (e.g., shown in FIG. 4 with the first transmitted element being on the right) to be in the same order (e.g., the first transmitted or first received elements on the left in each of sequence blocks 408, 412, 416, 420 in FIG. 4) relative to the received, reflected wave sequence 408, for example, reversed before being input into each of logic gate circuit implementations (422, 424, 426). In one embodiment, each of the time-shifted data (412, 416, 420) is compared to the received modulated data 406 (e.g., the received, reflected wave sequence 408) by a respective logic gate circuit implementation (422, 424, 426) that produces a respective output (428, 430, 432) that indicates a match value. In one embodiment, the highest (or lowest) of those values is chosen as the best match. For example, in an implementation where each of logic gate implementations (422, 424, 426) in an XOR logic gate implementation, the output therefrom is a true (e.g., logical one) if an odd number of its multiple arguments (e.g., in a same section of each of the values being compared) are true, and false (e.g., logical zero) otherwise. In one embodiment, a logical XOR is performed on multiple sections, and a final sum of those outputs is generated (e.g., sum of the is bits), and that is the value used as the respective output (428, 430, 432).

As another example, a demodulation of the received modulated data 406 (e.g., the received, reflected wave sequence 408 thereof) is performed (e.g., as discussed in reference to FIG. 6) and the demodulated (e.g., binary) representations of the received modulated data 406 (e.g., the received, reflected wave sequence 408 thereof) are time shifted, and that time-shifted data (412, 416, 420) is logically XORed with the (e.g., pseudo-random) sequence of bits (e.g., bits 302 in FIG. 3) used to generate the transmitted, modulated wave sequence 402 to create a resultant, and the resultant with the best match (e.g., indicating the most number of matching elements) is chosen as the delay time. For example, where a completely matching value of time-shifted demodulated representations of the received modulated data 406 (e.g., the received, reflected wave sequence 408) XORed with the sequence of bits (e.g., bits 302 in FIG. 3) used to generate the transmitted, modulated wave sequence 402 has a zero in all of the resultant's element positions (and thus the sum of all of those resultant elements is zero) such that the output (e.g., of outputs 428, 430, 432) is a zero, and thus indicates the best match. In one embodiment, the best match in FIG. 2 is delay two 414 where the binary bits of the demodulated, received reflected wave sequence 408 match with (e.g., most or all of) the binary bits of the transmitted modulated data 402 shifted by a time delay two 414 (e.g., a better match than for delay one 410 or delay three 418), for example, that causes the time shifted, binary bits of the transmitted modulated data 402 to line up between the beginning time 436 of the first demodulated bit of the received, reflected wave sequence 408 and the ending time 438 of the last demodulated bit of the received, reflected wave sequence 408. The numbers following the word delay (i.e., one, two, and three) are labels and not necessarily time values. In another embodiment, the smallest value of the outputs (428, 430, 432) indicates a maximum match and the corresponding time delay is determined to be the time delay for that transmission and reception operation. In one embodiment, the time delay begins at the time 434 the transmission of the modulated wave sequence 402 begins (or ends). In one embodiment, the maximum match is the most matches of bit values. In one embodiment, the minimum time delay (410, 414, 418) is greater than the period of time it takes for any near-end cross-talk to have occurred between an actuator (e.g., transmitter) and a sensor (e.g., receiver). In one embodiment, each transducer used to implement flow diagram 400 is on a single unmanned aerial system (e.g., unmanned aerial system 100 in FIG. 1, unmanned aerial system 200 in FIG. 2, or unmanned aerial system 900 in FIG. 9). In certain embodiments, the distance to surface 404 from the transducer(s) used is generated by dividing the determined delay time by two (e.g., the echo time) and multiplying that time (e.g., echo time) by the speed of sound (e.g., adjusted for the current temperature, humidity, etc.). The speed of sound in dry air at 20° Celsius is about 343 meters per second (m/s).

Figure 5:
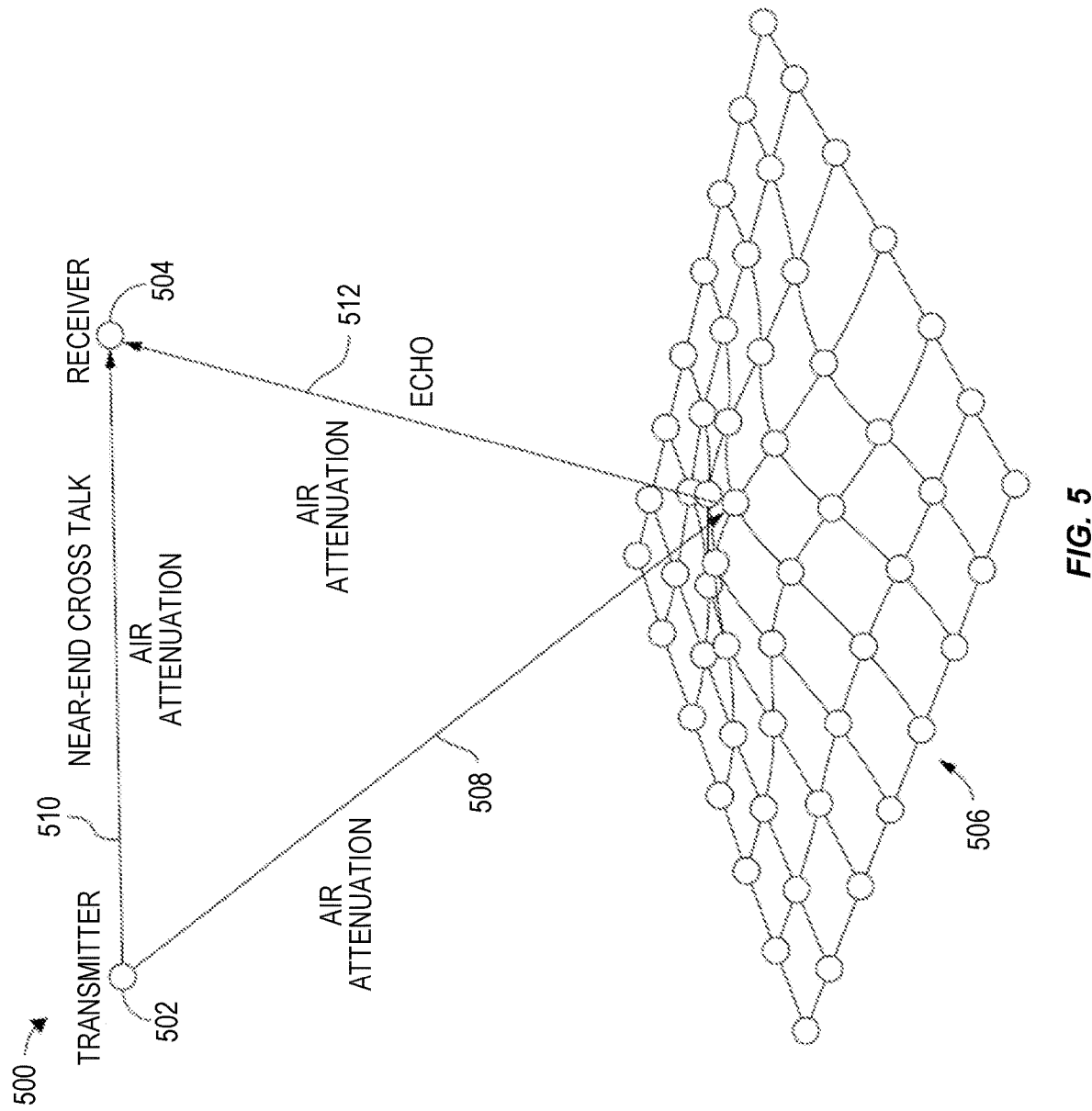
FIG. 5 is a three-dimensional view of transmitted sound and reflected sound propagation/echo model according to some embodiments.

FIG. 5 is a three-dimensional view of transmitted sound and reflected sound propagation/echo model 500 according to some embodiments. Certain embodiments herein utilize a transmitted sound and reflected sound propagation/echo model 500 that assumes that there is a single surface on which the sound will impact/reflect. This surface 506 is represented by an array of points, and the sound from the actuator (e.g., transmitter 502) is assumed to travel both the direct path 510 from the transmitter to the receiver (e.g., the near-end cross-talk) as well as the reflected path (508, 512) with the echo 512 bouncing off the surface. The sound arriving at each point in model 500 is assumed to be reflected to the receiver 504 with the intensity of the reflection being determined by a diffuse reflection parameter for a rougher surface added to a specular reflection parameter for a smoother surface, with the misalignment of the direction to the receiver compared to the ideal specular reflection direction. Air attenuation is included for all paths of this model 500. In certain embodiments, the time delay determined herein is the time (or a value representative of the time) it takes for a modulated wave sequence (e.g., modulated wave sequence 402 in FIG. 4) to travel the reflected path (508, 512).

Figure 6:
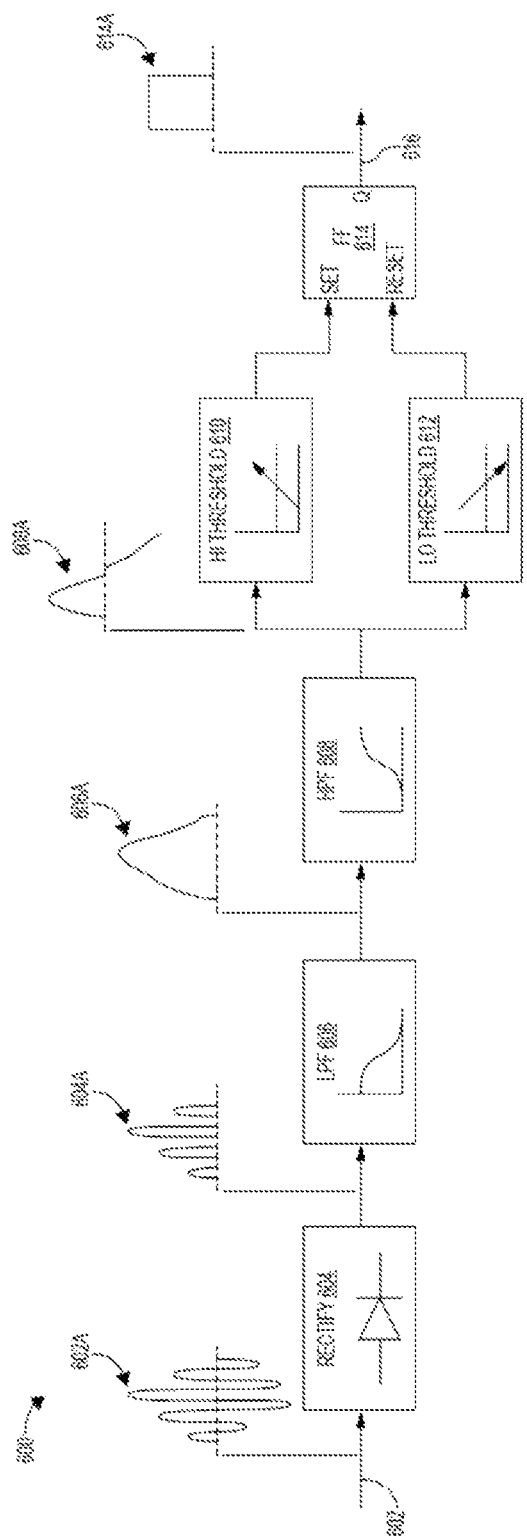
FIG. 6 is a flow diagram illustrating the demodulation of a received wave sequence according to some embodiments.

FIG. 6 is a flow diagram 600 illustrating the demodulation of a received wave sequence 602A according to some embodiments. In one embodiment, a control system (e.g., control system 214 of unmanned aerial system 200) includes circuitry according to flow diagram 600. Depicted flow 600 includes an input 602 of a received wave sequence 602A (for example, the received modulated data 406 (e.g., including the received, reflected wave sequence 408) in FIG. 4), and the output of a demodulated (e.g., binary) sequence of bits corresponding to the input 602. In the depicted embodiment, the wave form shown for received wave sequence 602A is merely an example and should not be used to limit this disclosure. Input 602 of received (e.g., section of) wave sequence 602A (e.g., data) is input into rectifier 604 which retains the positive portions of the received wave sequence 602A and removes the negative (e.g., relative to the dotted horizontal line) of the received wave sequence 602A to form rectified sequence 604A. Rectified sequence 604A is input into low pass filter 606 to filter out frequencies above a low frequency threshold (e.g., removing those frequencies having a −3 decibel (dB) point ("half power" point) higher than about 2 kHz) to form low pass filtered sequence 606A (e.g., to form a low pass envelope of an AM value). Low pass filtered sequence 606A is input into high pass filter 608 to filter out frequencies below a high frequency threshold (e.g., removing those frequencies having a −3 decibel (dB) point ("half power" point) lower than about 10 Hz) to form a low pass and high pass filtered sequence 608A (e.g., to eliminate direct current (DC) bias). Low pass and high pass filtered sequence 608A is input to high threshold detector 610 to output a first value (e.g., binary one) when the low pass and high pass filtered sequence 608A is above a threshold (e.g., having a root mean square (RMS) value that is above 15% of the RMS value of the wave sequence 602A) and to low threshold detector 612 to output a second value (e.g., binary zero) when the low pass and high pass filtered sequence 608A is below a threshold (e.g., having a root mean square (RMS) value that is below 15% of the RMS value of the wave sequence 602A) (e.g., to perform threshold detection with hysteresis). The output of each of high threshold detector 610 and low threshold detector 612 are couple to the set (s) and reset (R) ports, respectively, of latch 614. Latch 614 is clocked to generate an output 616 (Q) (e.g., in a single clock cycle) of a one when the low pass and high pass filtered sequence 608A is above the threshold (e.g., to assert "set") and a zero when the low pass and high pass filtered sequence 608A is below the threshold (e.g., to assert "reset"). In the depicted embodiment, the most recent output 614A is a binary one (e.g., high instead of low compared to the dotted line there).

In one embodiment, each section of a received wave sequence 602A is input into (e.g., in consecutive cycles of the latch 614 to produce a sequence of bits (e.g., the demodulated representations of the received modulated data 406 as discussed in reference to FIG. 4). Although a set-reset (SR) flip-flop is shown as latch 614, other clocked latches may be used. In one embodiment, time varying signal 614A is generated at the same sampling rate (e.g., used by sampling from an acoustic sensor) of the received wave sequence 602A (e.g., the sampling rate of the received, reflected wave sequence 408 in FIG. 4).

FIG. 7 is a flow diagram 700 illustrating the range finding control of an unmanned aerial system according to some embodiments. Depicted flow 700 includes (optionally) providing power to at least one motor of an unmanned aerial system to provide propulsion, wherein the unmanned aerial system includes an acoustic actuator having a resonant frequency and an acoustic sensor having the resonant frequency at 702; modulating a fixed frequency, at the resonant frequency, carrier wave according to a pseudo-random sequence of bits to produce a modulated wave sequence having a respective section of the carrier wave for each bit of the bits of the pseudo-random sequence having a first value, and a respective section of the carrier wave for each bit of the bits of the pseudo-random sequence having a second value at 704; transmitting the modulated wave sequence from the acoustic actuator at 706; receiving a reflected wave sequence including a reflection of the modulated wave sequence with the acoustic sensor at 708; determining a delay time between the transmitting and the receiving of the modulated wave sequence based on the reflected wave sequence received by the acoustic sensor and the modulated wave sequence transmitted by the acoustic actuator at 710; and (optionally) modifying the power provided to the at least one motor based on the delay time at 712. The providing power and modifying the power may be removed in other embodiments, e.g., to allow range finding in other environments than an unmanned aerial system.

Figure 8:
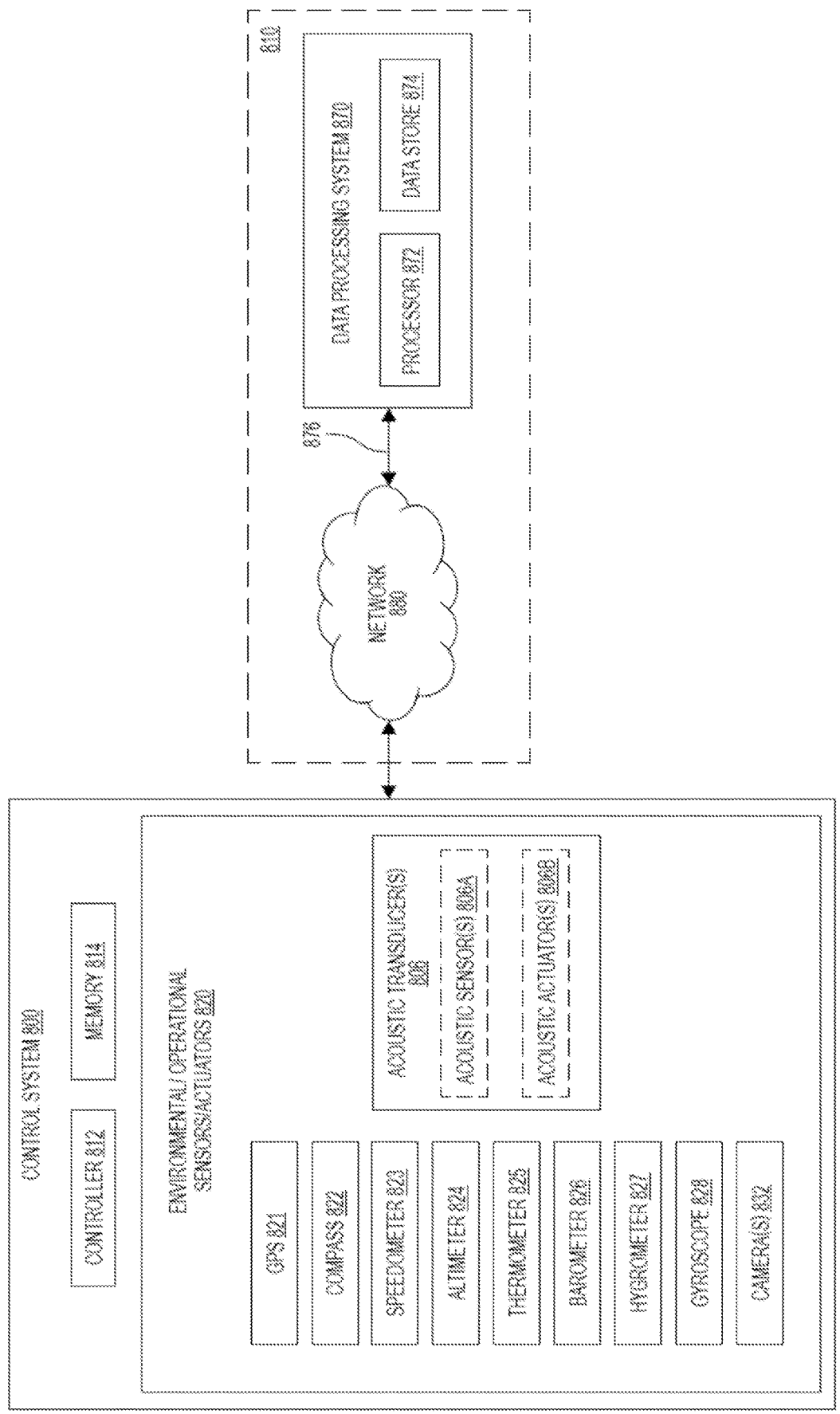
FIG. 8 is a block diagram depicting a control system of an unmanned aerial system according to some embodiments.

FIG. 8 is a block diagram depicting a control system 800 of an unmanned aerial system according to some embodiments. Optionally, control system 800 may be coupled to external resources 810 via a network 880. The control system 800 includes a controller 812 (e.g., processor), a memory 814 (e.g., coupled to the controller), and a plurality of environmental or operational sensors/actuators 820 that includes at least one acoustic transducer(s) 806 (e.g., coupled to the controller 812). Acoustic transducer(s) 806 may include an acoustic (e.g., sound) sensor(s) 806A and/or acoustic (e.g., sound) actuator(s) 806B. A transducer may be a piezoelectric transducer.

In one embodiment, the controller is to perform any of the operations discussed herein, e.g., for range finding. The controller may be a processor that performs computing functions. For example, the controller 812 may control any aspects of the operation of the control system 800 and the one or more computer-based components thereon, e.g., including the plurality of environmental or operational sensors/actuators 820. The controller 812 may generate control values for conducting operations thereof, e.g., for operating one or more rotors, motors, rudders, ailerons, flaps or other components of an unmanned aerial system. Such control systems may be associated with one or more other computing devices or machines, and may communicate with the data processing system 870 or one or more other computer devices over the network 880, through the sending and receiving of data. The control system 800 further includes one or more memory (e.g., storage) components 814 for storing any type of information or data, e.g., code for operating an unmanned aerial system (e.g., based on delay time or other range finding) and/or information or data detected by one or more of the environmental or operational sensors/actuators 820 (e.g., acoustic sensor(s) 806A and/or acoustic actuator(s) 806B).

The control system 800 may communicate through one or more wireless connections (e.g., wireless protocols or networks, such as Global System for Mobile Communications (GSM) network, a Code Division Multiple Access (CDMA) network, a Long Term Evolution (LTE) network, Bluetooth® or any Wireless Fidelity (or "Wi-Fi") protocol) over the network 880 or directly.

The environmental or operational sensors/actuators 820 may include any components or features for determining one or more attributes of an environment in which the unmanned aerial system being controlled by control system 800 is operating, or may be expected to operate, including extrinsic information or data or intrinsic information or data. As is shown in FIG. 8, the environmental or operational sensors/actuators 820 may include, but are not limited to, a Global Positioning System ("GPS") receiver or sensor 821, a compass 822, a speedometer 823, an altimeter 824, a thermometer 825, a barometer 826, a hygrometer 827, a gyroscope 828, and/or camera(s) 832. The GPS sensor 821 may be any device, component, system or instrument adapted to receive signals (e.g., trilateration data or information) relating to a position of the unmanned aerial system being controlled by control system 800 from one or more GPS satellites of a GPS network, e.g., separate from use of an acoustic transducer for range finding. The compass 822 may be any device, component, system, or instrument adapted to determine one or more directions with respect to a frame of reference that is fixed with respect to the surface of the Earth (e.g., a pole thereof). The speedometer 823 may be any device, component, system, or instrument for determining a speed or velocity of the unmanned aerial system being controlled by control system 800, and may include related components such as pitot tubes, accelerometers, or other features for determining speeds, velocities, or accelerations.

The altimeter 824 may be any device, component, system, or instrument for determining an altitude of the unmanned aerial system being controlled by control system 800, and may include any number of barometers, transmitters, receivers, range finders (e.g., laser or radar) or other features for determining heights. The thermometer 825, the barometer 826, and the hygrometer 827 may be any devices, components, systems, or instruments for determining local air temperatures, atmospheric pressures, or humidities within a vicinity of the unmanned aerial system being controlled by control system 800. The gyroscope 828 may be any mechanical or electrical device, component, system, or instrument for determining an orientation, e.g., the orientation of the unmanned aerial system being controlled by control system 800. For example, the gyroscope 828 may be a mechanical gyroscope having at least a pair of gimbals and a flywheel or rotor. Alternatively, the gyroscope 828 may be an electrical component such as a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the unmanned aerial system being controlled by control system 800. The camera 832 may be any type or form of camera, e.g., such as digital still cameras, red, green, blue (RGB) cameras, video cameras, or thermographic cameras. An acoustic transducer 806 may be a transducer (e.g., a dynamic microphone, a condenser microphone, a ribbon microphone, a crystal microphone) that converts acoustic energy of any intensity and across any or all frequencies into one or more electrical signals, and may include any number of diaphragms, magnets, coils, plates, or other like features for detecting and recording such energy. The acoustic transducer 806 may also be provided as a discrete component, or in combination with one or more other components, e.g., an imaging device, such as a digital camera. Furthermore, an acoustic transducer 806 may detect and record acoustic energy (e.g., waves) from any and all directions.

In certain embodiments, the environmental or operational sensors/actuators 820 include any type or form of device or component for determining an environmental condition within a vicinity of the unmanned aerial system being controlled by control system 800 in accordance with the present disclosure. For example, the environmental or operational sensors/actuators 820 may include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), altitude indicators, depth gauges, accelerometers or the like, as well as one or more imaging devices (e.g., digital cameras), and are not limited to the sensors/actuators shown in FIG. 8.

The optional data processing system 870 includes one or more data stores 874, as well as one or more computer processors 872 provided for any specific or general purpose. For example, the data processing system 870 of FIG. 8 may be independently provided for the exclusive purpose of receiving, analyzing or storing acoustic data (e.g., sounds), propeller blade treatment positions, corresponding lifting forces, anti-sounds, and/or other information or data received from the control system 800 or, alternatively, provided in connection with one or more physical or virtual services that receive, analyze or store such sounds, information or data, as well as one or more other functions. The processor(s) 872 may be coupled to or otherwise communicate the data stores 874. The data stores 874 may store any type of information or data, including but not limited to sound information or data, and/or information or data regarding environmental conditions, operational characteristics, or positions, for any purpose. The computer processor(s) 872 may also connect to or otherwise communicate with the network 880, as indicated by line 876, through the sending and receiving of data. For example, the data processing system 870 may include any facilities, stations or locations having the ability or capacity to receive and store information or data, such as media files, in one or more data stores, e.g., media files received from the control system 800, or from one another, or from one or more other external computer systems via the network 880. In some implementations, the data processing system 870 may be provided in a physical location. In other such implementations, the data processing system 870 may be provided in one or more alternate or virtual locations, e.g., in a "cloud" based environment.

The network 880 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and, thus, need not be described in more detail herein.

In certain embodiments, the computers, devices and the like described herein have the necessary electronics, software, memory, storage, databases, firmware, logic/state machines, microprocessors, communication links, displays, or other visual or audio user interfaces, printing devices, and any other input/output interfaces to provide any of the functions or services described herein and/or achieve the results described herein. Also, those of ordinary skill in the pertinent art will recognize that users of such computers, UAS, devices, and the like may operate a keyboard, keypad, mouse, stylus, touch screen, or other device or method to interact with the computers, UAS, and the like, or to "select" an item, link, node, hub or any other aspect of the present disclosure.

The control system 800 or the data processing system 870 may use any web-enabled or Internet applications or features, or any other client-server applications or features including E-mail or other messaging techniques, to connect to the network 880, or to communicate with one another, such as through short or multimedia messaging service (SMS or MMS) text messages. For example, the control system 800 may transmit information or data in the form of synchronous or asynchronous messages to the data processing system 870 or to any other computer device in real time or in near-real time, or in one or more offline processes, via the network 880.

The data and/or computer executable instructions, programs, firmware, software and the like (also referred to herein as "computer executable" components) described herein may be stored on a non-transitory, computer-readable medium that is within or accessible by computers or computer components such as the controller 812 or the processor 872, or any other computers or control systems utilized by the control system 800 or the data processing system 870, and having sequences of instructions which, when executed by a processor (e.g., a central processing unit, or "CPU"), cause the processor to perform all or a portion of the functions, services, and/or methods described herein. Such computer executable instructions, programs, software, and the like may be loaded into the memory of one or more computers using a drive mechanism associated with the computer readable medium, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program to access, or include signals that may be downloaded through the Internet or other networks.

Figure 9:
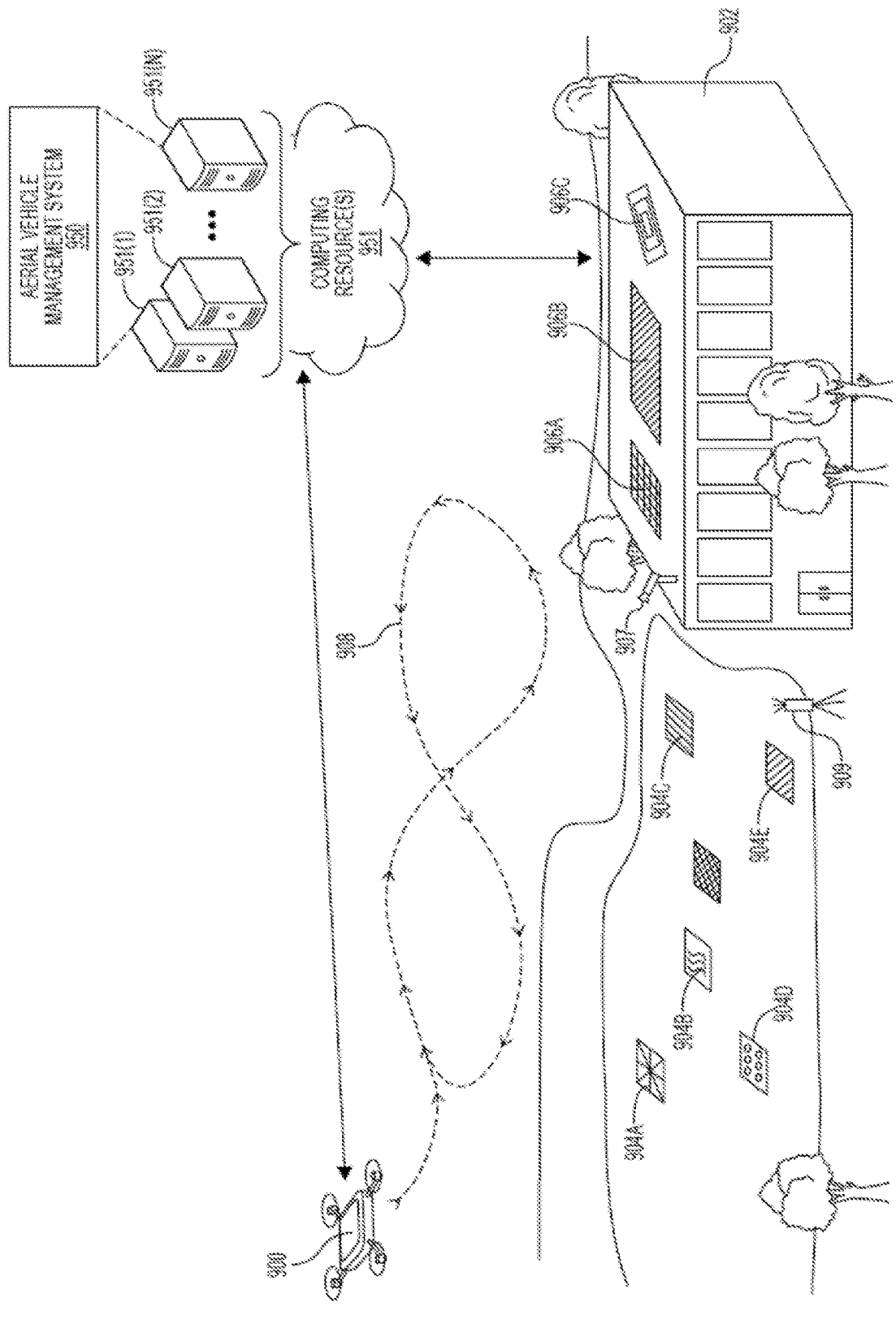
FIG. 9 depicts a material handling facility for an unmanned aerial system according to some embodiments.

FIG. 9 depicts a material handling facility 902 for an unmanned aerial system 900 according to some embodiments. A material handling facility, as used herein, may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling. In some implementations, the aerial system 900 may be utilized to aerially transport an item from the materials handling facility to a customer specified delivery destination. For example, a customer may order or purchase an item through an electronic-commerce website and request that the item be delivered to a specific delivery destination (e.g., the customer's home). The item may be picked from an inventory location within the materials handling facility and secured to the aerial system 900 for transport. The aerial system may depart from the materials handling facility and aerially navigate to the customer specified delivery destination to complete the delivery of the item.

Rather than require a full calibration of sensors prior to flight departure of the aerial system from the materials handling facility, the implementations described herein provide a system, method, and apparatus to verify the calibration of the sensors of the aerial system as part of the preparation for departure of the aerial system. If it is determined that the calibration of the sensors is within an expected tolerance range, the aerial system is allowed to continue flight without requiring a full calibration. If the calibration exceeds the expected tolerance range, a full calibration of one or more sensors on the aerial system may be performed prior to departure. As discussed below, in some implementations, regardless of whether the sensors are within the expected tolerance range, a full calibration may be periodically performed.

Returning to FIG. 9, as part of a departure of the aerial system 900 from the materials handling facility 902 and/or as part of a return of the aerial system 900 to the materials handling facility 902, the aerial system may aerially navigate a specific flight path 908 over one or more markers 904A-904E so that the one or more markers are within a field of view of one or more cameras coupled to the aerial system 900, as discussed above with respect to FIG. 9.

The markers 904A-904E are at known positions adjacent the materials handling facility. Likewise, the markers are placed at a known orientation, have a known size, known shape, known color, and/or known pattern. In some implementations, the marker may be similar to a marker that will be positioned at a customer specified delivery destination. Known marker information (size, shape, position, orientation, color, pattern, etc.) is referred to herein as actual information. Reference to actual information is intended to include one or more known items of information about one or more markers. Actual information may be maintained in a data store accessible to the management system 950 and/or the aerial system 900. Alternatively, or in addition thereto, actual information may be stored in a memory of the aerial system 900.

Any number of markers, such as markers 904A, 904B, 904C, 904D, 904E (e.g., any plurality of markers) may be positioned adjacent the materials handling facility 902. In some implementations, in addition to or as an alternative to the markers 904A-904E positioned adjacent the materials handling facility, one or more markers 906A, 906B, 906C, having a known size, shape, position, orientation, color, pattern, etc., may be affixed to or otherwise included on an exterior of the materials handling facility 902. In such an example, rather than or in addition to aerially navigating over the markers 904A-904E, the aerial system may navigate over the markers such that one or more of the markers 906A-906C are within a field of view of one or more cameras of the aerial system 900.

It will be appreciated that the aerial system need not aerially navigate directly over the markers to facilitate the described implementations. Rather, any aerial navigation by the aerial system such that one or more of the markers 904A-E, 906A-C are within a field of view of one or more cameras coupled to the aerial system is sufficient.

The images obtained by the aerial system 900 that include representations of the markers 904A-904E, 906A-906C are provided to a management system 950. The management system 950 may be operating on one or more remote computing resources 951. The remote computing resources 951 may form a portion of a network-accessible computing platform implemented as a computing infrastructure of processors, storage, software, data access, and other components that is maintained and accessible via a network. The aerial system 900 and/or the materials handling facility 902 may communicatively couple to the computing resources 951 via a network which may represent wired technologies (e.g., wires, USB, fiber optic cable, etc.), wireless technologies (e.g., RF, cellular, satellite, Bluetooth, etc.), and/or other connection technologies.

As illustrated, the computing resources 951 may include one or more servers, such as servers 951(1), 951(2), . . . 951(N). These servers 951(1)-(N) may be arranged in any number of ways, such as server farms, stacks, and the like that are commonly used in data centers. Furthermore, the servers 951(1)-(N) may include one or more processors and memory which may store the management system 950.

The management system 950 may process the received images to determine, among other information, a size, shape, position, orientation, color, pattern, and/or other information about the markers based on the representation of the markers in the received images. Such information is referred to herein as processed information and corresponds to information about the markers that is determined from a processing of images obtained from cameras coupled to the aerial system. Processed information is intended to include one or more of determined aspects of information about one or more markers as determined from processing the image information.

The management system 950 may then compare the processed information with actual information to determine a variation between the processed information and the actual information. For example, a size variation may be determined by comparing a size of the marker, as determined from the processed image, with an actual size of the marker, as maintained in a data store. As another example, a shape variation may be determined by comparing a shape of the marker, as determined from the processed image, with an actual shape of the marker, as maintained in the data store. As another example, a color variation may be determined by comparing a color of the marker, as determined from the processed image, with an actual color of the marker, as maintained as actual information in the data store. As another example, a pattern variation may be determined by comparing a pattern of the marker, as determined from the processed image, with an actual pattern of the marker, as maintained in the data store.

If one or more of the variations exceed a correction threshold, the aerial system may be instructed to land and be scheduled for a full calibration of the camera(s) coupled to the aerial system. In comparison, if the variations are within an expected tolerance range, the aerial system may be allowed to continue flight. In some implementations, the aerial system management system may send instructions to the aerial system 900 to adjust the calibration of the camera. Such instructions may account for the difference between the information determined from the image and the actual information.

In some implementations, the aerial system may provide other sensor information obtained from other sensors coupled to the aerial system. For example, the aerial system may provide sensor information indicating a heading of the aerial system, an altitude of the aerial system, a pose of the aerial system, a speed of the aerial system, a velocity of the aerial system, etc. Likewise, one or more cameras within the environment, such as camera 907 affixed to the materials handling facility 902 may obtain images of the aerial system 900 as the aerial system follows the flight path 908. The images obtained by the camera 907 may be processed to determine an actual heading of the aerial system, an actual pose of the aerial system, an actual speed of the aerial system, a velocity of the aerial system, etc. For example, a series of images may be obtained by the camera 907 and processed to determine an amount of movement of the aerial system over a period of time and, thus, calculate the actual speed and/or the actual velocity. Likewise, images from cameras 907 in the environment may be processed to determine a heading or a pose of the aerial system by determining a direction of travel of the aerial system over a period of time by detecting, using object recognition, a marker on the aerial system that can be used to determine an orientation or pose of the aerial system, etc.

Likewise, in some implementations, one or more other sensors that are external to the aerial system 900 and positioned adjacent or on the materials handling facility 902 may obtain information about the aerial system as the aerial system navigates the flight path 908. For example, a distance determining element 909 (a sensor), such as a time of flight sensor, LIDAR, SONAR, etc., may be positioned adjacent a departure location of the materials handling facility 902 and measure a distance between a distance determining element and the UAV. In such an example, the aerial system may provide altitude information as determined by a sensor of the aerial system 900 and the aerial system management system may compare the measured actual distance (and any offset based on the location of the distance determining element) and the received altitude (processed information) to determine whether a variation between the actual distance and the processed information is within an altitude tolerance range. If it is determined that the variation is within an altitude variation range, the aerial system may be allowed to continue a flight toward the customer specified delivery destination. Likewise, instructions may be sent that cause a software correction in an amount corresponding to the altitude variation. If the altitude variation exceeds a correction threshold, it may be determined that the sensor of the aerial system is out of calibration and flight of the aerial system toward the customer specified delivery destination aborted so that a full calibration of the aerial system sensors may be performed.

In one embodiment, a delay time is determined according to this disclosure, and the corresponding range (for example, distance to the object (e.g., the ground) determined from the delay time and the speed of sound) for that delay time is compared to the actual range of the unmanned aerial system 900 as measured by a sensor external from the unmanned aerial system. In this way, the functionality of the unmanned aerial system's controller that determines the delay time may be checked before the unmanned aerial system 900 departs the location of the material handling facility 902. In one embodiment, a plurality of delay times (e.g., their corresponding ranges (e.g., distances to a reflected object)) are used to form a three-dimensional map of the reflected objects (e.g., surface 506 in FIG. 5).

In one embodiment, an unmanned aerial system includes at least one motor to provide propulsion; a piezoelectric acoustic actuator having a resonant frequency; a piezoelectric acoustic sensor having the resonant frequency; and a controller to: modulate a fixed amplitude and fixed frequency, at the resonant frequency, carrier wave (e.g., value) according to a pseudo-random sequence of bits to produce a modulated wave sequence (e.g., value) having a respective section of the carrier wave for each bit of the bits of the pseudo-random sequence having a first value, and a respective section of the carrier wave for each bit of the bits of the pseudo-random sequence having a second value, transmit the modulated wave sequence from the piezoelectric acoustic actuator, receive a reflected wave sequence (e.g., value) including a reflection of the modulated wave sequence with the piezoelectric acoustic sensor, determine a delay time between the transmit and the receive of the modulated wave sequence based on the reflected wave sequence received by the piezoelectric acoustic sensor and the modulated wave sequence transmitted by the piezoelectric acoustic actuator, and modify power provided to the at least one motor based on the delay time. The controller may demodulate the reflected wave sequence into a demodulated sequence of bits, and determine the delay time based on the demodulated sequence of bits and the pseudo-random sequence of bits. The controller may iteratively time shift the pseudo-random sequence of bits to determine a time offset that generates a maximum number of bits of the pseudo-random sequence of bits that match the demodulated sequence of bits, wherein the time offset is the delay time.

In another embodiment, an unmanned aerial system includes at least one motor to provide propulsion; an acoustic actuator having a resonant frequency; an acoustic sensor having the resonant frequency; and a controller to: modulate a fixed frequency, at the resonant frequency, carrier wave according to a pseudo-random sequence of bits to produce a modulated wave sequence having a respective section of the carrier wave for each bit of the bits of the pseudo-random sequence having a first value, and a respective section of the carrier wave for each bit of the bits of the pseudo-random sequence having a second value, transmit the modulated wave sequence from the acoustic actuator, receive a reflected wave sequence including a reflection of the modulated wave sequence with the acoustic sensor, determine a delay time between the transmit and the receive of the modulated wave sequence based on the reflected wave sequence received by the acoustic sensor and the modulated wave sequence transmitted by the acoustic actuator, and modify power provided to the at least one motor based on the delay time. The controller may demodulate the reflected wave sequence into a demodulated sequence of bits, and determine the delay time based on the demodulated sequence of bits and the pseudo-random sequence of bits. The controller may iteratively time shift the pseudo-random sequence of bits to determine a time offset that generates a maximum number of bits of the pseudo-random sequence of bits that match the demodulated sequence of bits, wherein the time offset is the delay time. The acoustic actuator and the acoustic sensor may be implemented as a single piezoelectric transducer that the controller switches from an actuator mode to transmit the modulated wave sequence and a sensor mode to receive the reflected wave sequence. The controller may not transmit the modulated wave sequence from the acoustic actuator while receiving the reflected wave sequence with the acoustic sensor. The controller may not receive the reflected wave sequence with the acoustic sensor until a period of time, including cross-talk between the acoustic actuator and the acoustic sensor, has elapsed after the transmit of the modulated wave sequence from the acoustic actuator. The unmanned aerial system may include a linear-feedback shift register to generate the pseudo-random sequence of bits. The controller may use a shorter length of the pseudo-random sequence of bits as the delay time between the transmit and the receive of the modulated wave sequence decreases. The acoustic actuator and the acoustic sensor may both be pointed downward at least when in a landing orientation.

In yet another embodiment, a computer-implemented method includes providing power to at least one motor of an unmanned aerial system to provide propulsion, wherein the unmanned aerial system includes an acoustic actuator having a resonant frequency and an acoustic sensor having the resonant frequency; modulating a fixed frequency, at the resonant frequency, carrier wave according to a pseudo-random sequence of bits to produce a modulated wave sequence having a respective section of the carrier wave for each bit of the bits of the pseudo-random sequence having a first value, and a respective section of the carrier wave for each bit of the bits of the pseudo-random sequence having a second value; transmitting the modulated wave sequence from the acoustic actuator; receiving a reflected wave sequence including a reflection of the modulated wave sequence with the acoustic sensor; determining a delay time between the transmit and the receive of the modulated wave sequence based on the reflected wave sequence received by the acoustic sensor and the modulated wave sequence transmitted by the acoustic actuator; and modifying the power provided to the at least one motor based on the delay time. The method may include demodulating the reflected wave sequence into a demodulated sequence of bits, wherein the determining of the delay time is based on the demodulated sequence of bits and the pseudo-random sequence of bits. The method may include iteratively time shifting the pseudo-random sequence of bits to determine a time offset that generates a maximum number of bits of the pseudo-random sequence of bits that match the demodulated sequence of bits, wherein the time offset is the delay time. The acoustic actuator and the acoustic sensor may be implemented as a single piezoelectric transducer, and the method may include switching from an actuator mode to transmit the modulated wave sequence and a sensor mode to receive the reflected wave sequence. The method may include not transmitting the modulated wave sequence from the acoustic actuator while receiving the reflected wave sequence with the acoustic sensor. The method may include not receiving the reflected wave sequence with the acoustic sensor until a period of time, including cross-talk between the acoustic actuator and the acoustic sensor, has elapsed after the transmit of the modulated wave sequence from the acoustic actuator. The method may include using a shorter length of the pseudo-random sequence of bits as the delay time between the transmitting and the receiving decreases. The method may include pointing the acoustic actuator and the acoustic sensor downward at least when the unmanned aerial system is in a landing orientation.

In another embodiment, an unmanned aerial system includes at least one motor to provide propulsion; a piezoelectric acoustic actuator having a resonant frequency; a piezoelectric acoustic sensor having the resonant frequency; and means to: modulate a fixed amplitude and fixed frequency, at the resonant frequency, carrier wave according to a pseudo-random sequence of bits to produce a modulated wave sequence having a respective section of the carrier wave for each bit of the bits of the pseudo-random sequence having a first value, and a respective section of the carrier wave for each bit of the bits of the pseudo-random sequence having a second value, transmit the modulated wave sequence from the piezoelectric acoustic actuator, receive a reflected wave sequence including a reflection of the modulated wave sequence with the piezoelectric acoustic sensor, determine a delay time between the transmit and the receive of the modulated wave sequence based on the reflected wave sequence received by the piezoelectric acoustic sensor and the modulated wave sequence transmitted by the piezoelectric acoustic actuator, and modify power provided to the at least one motor based on the delay time.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 951(1) to 951(N)) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An unmanned aerial system comprising:
   at least one motor to provide propulsion;
   a piezoelectric acoustic actuator having a resonant frequency;
   a piezoelectric acoustic sensor having the resonant frequency; and
   a controller configured to:
      modulate a fixed amplitude and fixed frequency, at the resonant frequency, carrier wave according to a pseudo-random sequence of bits to produce a modulated wave sequence having a respective section of the carrier wave for each bit of the bits of the pseudo-random sequence having a first value, and a respective section without the carrier wave for each bit of the bits of the pseudo-random sequence having a second value,
      transmit the modulated wave sequence from the piezoelectric acoustic actuator,
      receive a reflected wave sequence including a reflection of the modulated wave sequence with the piezoelectric acoustic sensor,
      determine a delay time between the transmittal and the receipt of the modulated wave sequence based on the reflected wave sequence received by the piezoelectric acoustic sensor and the modulated wave sequence transmitted by the piezoelectric acoustic actuator, and
      modify power provided to the at least one motor based on the delay time.

2. The unmanned aerial system of claim 1, wherein the controller is configured to demodulate the reflected wave sequence into a demodulated sequence of bits, and determine the delay time based on the demodulated sequence of bits and the pseudo-random sequence of bits.

3. The unmanned aerial system of claim 2, wherein the controller is configured to iteratively time shift the pseudo-random sequence of bits to determine a time offset that generates a maximum number of bits of the pseudo-random sequence of bits that match the demodulated sequence of bits, wherein the time offset is the delay time.

4. An unmanned aerial system comprising:
   at least one motor to provide propulsion;
   an acoustic actuator having a resonant frequency;
   an acoustic sensor having the resonant frequency; and
   a controller configured to:
      modulate a fixed frequency, at the resonant frequency, carrier wave according to a pseudo-random sequence of bits to produce a modulated wave sequence having a respective section of the carrier wave for each bit of the bits of the pseudo-random sequence having a first value, and a respective section without the carrier wave for each bit of the bits of the pseudo-random sequence having a second value,
      transmit the modulated wave sequence from the acoustic actuator,
      receive a reflected wave sequence including a reflection of the modulated wave sequence with the acoustic sensor,
      determine a delay time between the transmittal and the receipt of the modulated wave sequence based on the reflected wave sequence received by the acoustic sensor and the modulated wave sequence transmitted by the acoustic actuator, and
      modify power provided to the at least one motor based on the delay time.

5. The unmanned aerial system of claim 4, wherein the controller is configured to demodulate the reflected wave sequence into a demodulated sequence of bits, and determine the delay time based on the demodulated sequence of bits and the pseudo-random sequence of bits.

6. The unmanned aerial system of claim 5, wherein the controller is configured to iteratively time shift the pseudo-random sequence of bits to determine a time offset that generates a maximum number of bits of the pseudo-random sequence of bits that match the demodulated sequence of bits, wherein the time offset is the delay time.

7. The unmanned aerial system of claim 4, wherein the acoustic actuator and the acoustic sensor are implemented as a single piezoelectric transducer that the controller switches from an actuator mode to transmit the modulated wave sequence and a sensor mode to receive the reflected wave sequence.

8. The unmanned aerial system of claim 4, wherein the controller is configured to not transmit the modulated wave sequence from the acoustic actuator while receiving the reflected wave sequence with the acoustic sensor.

9. The unmanned aerial system of claim 4, wherein the controller is configured to not receive the reflected wave sequence with the acoustic sensor until a period of time, including cross-talk between the acoustic actuator and the acoustic sensor, has elapsed after the transmittal of the modulated wave sequence from the acoustic actuator.

10. The unmanned aerial system of claim 4, further comprising a linear-feedback shift register to generate the pseudo-random sequence of bits.

11. The unmanned aerial system of claim 4, wherein the controller is configured to use a shorter length of the pseudo-random sequence of bits as the delay time between the transmittal and the receipt of the modulated wave sequence decreases.

12. The unmanned aerial system of claim 4, wherein the acoustic actuator and the acoustic sensor are pointed downward at least when in a landing orientation.

13. A computer-implemented method comprising:
providing power to at least one motor of an unmanned aerial system to provide propulsion, wherein the unmanned aerial system includes an acoustic actuator having a resonant frequency and an acoustic sensor having the resonant frequency;
modulating a fixed frequency, at the resonant frequency, carrier wave according to a pseudo-random sequence of bits to produce a modulated wave sequence having a respective section of the carrier wave for each bit of the bits of the pseudo-random sequence having a first value, and a respective section without the carrier wave for each bit of the bits of the pseudo-random sequence having a second value;
transmitting the modulated wave sequence from the acoustic actuator;
receiving a reflected wave sequence including a reflection of the modulated wave sequence with the acoustic sensor;
determining a delay time between the transmitting and the receiving of the modulated wave sequence based on the reflected wave sequence received by the acoustic sensor and the modulated wave sequence transmitted by the acoustic actuator; and
modifying the power provided to the at least one motor based on the delay time.

14. The computer-implemented method of claim 13, further comprising demodulating the reflected wave sequence into a demodulated sequence of bits, wherein the determining of the delay time is based on the demodulated sequence of bits and the pseudo-random sequence of bits.

15. The computer-implemented method of claim 14, further comprising iteratively time shifting the pseudo-random sequence of bits to determine a time offset that generates a maximum number of bits of the pseudo-random sequence of bits that match the demodulated sequence of bits, wherein the time offset is the delay time.

16. The computer-implemented method of claim 13, wherein the acoustic actuator and the acoustic sensor are implemented as a single piezoelectric transducer, and the method further comprises switching from an actuator mode to transmit the modulated wave sequence and a sensor mode to receive the reflected wave sequence.

17. The computer-implemented method of claim 13, further comprising not transmitting the modulated wave sequence from the acoustic actuator while receiving the reflected wave sequence with the acoustic sensor.

18. The computer-implemented method of claim 13, further comprising not receiving the reflected wave sequence with the acoustic sensor until a period of time, including cross-talk between the acoustic actuator and the acoustic sensor, has elapsed after the transmittal of the modulated wave sequence from the acoustic actuator.

19. The computer-implemented method of claim 13, further comprising using a shorter length of the pseudo-random sequence of bits as the delay time between the transmitting and the receiving decreases.

20. The computer-implemented method of claim 13, further comprising pointing the acoustic actuator and the acoustic sensor downward at least when the unmanned aerial system is in a landing orientation.

\* \* \* \* \*